(No Model.)
O. GLISMANN.
HORSE BOOT.
No. 393,974. Patented Dec. 4, 1888.
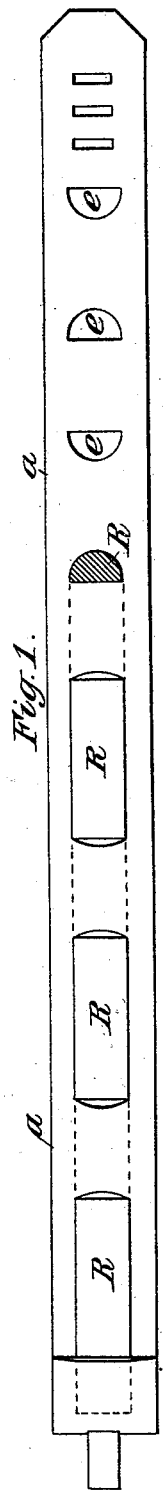
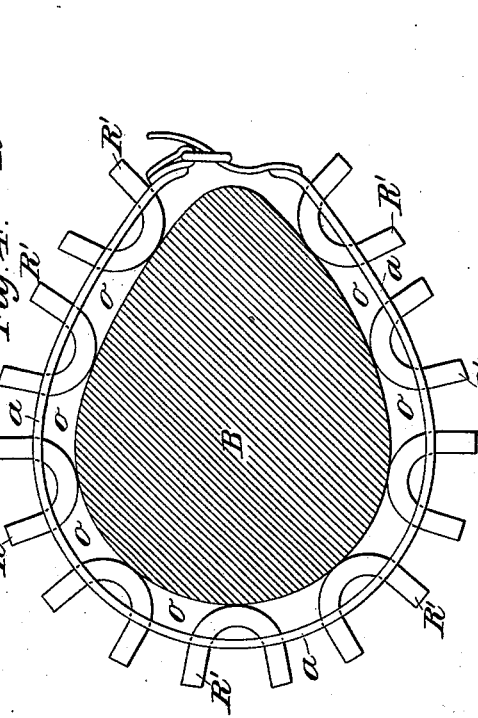
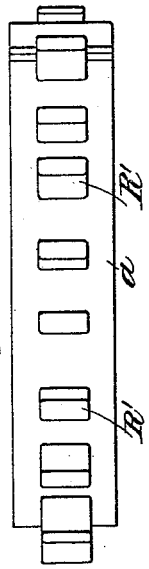
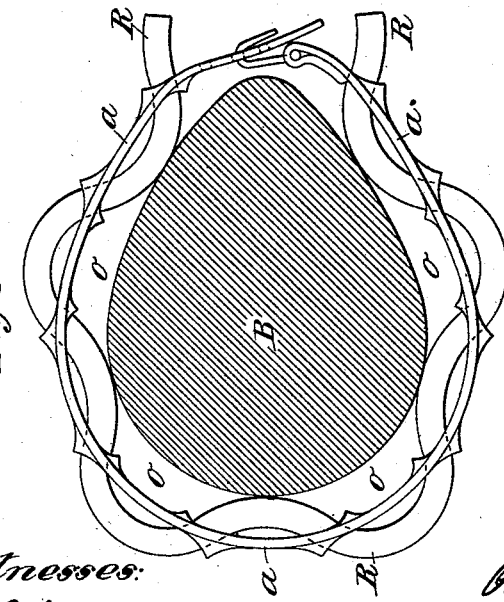
Witnesses:
O. E. Sundgren.
Fred. Haynes.
Inventor:
Otto Glismann,
by attorney
Henry T. Brown.

UNITED STATES PATENT OFFICE.

OTTO GLISMANN, OF HAMBURG, GERMANY.

HORSE-BOOT.

SPECIFICATION forming part of Letters Patent No. 393,974, dated December 4, 1888.

Application filed September 27, 1888. Serial No. 286,535. (No model.)

*To all whom it may concern:*

Be it known that I, OTTO GLISMANN, of the city of Hamburg, in the Empire of Germany, have invented a new and useful Improvement in Horse-Leg Fenders, of which the following is a specification, reference being had to the accompanying drawings.

The object of this invention is to provide a leg guard or fender or interfering attachment for horses which shall not gall or heat the leg of the animal by reason of the lodging of dirt therein and want of ventilation, as in ordinary leg guards or fenders.

I will now proceed to describe the invention with reference to the drawings, and afterward point out the novelty in a claim.

Figure 1 is a side view, and Fig. 2 a plan view, of one of my improved leg-fenders, showing the same partly unfinished. Fig. 3 is a plan view showing the same leg-fender finished and fastened in position to the leg B of a horse. Fig. 4 is a plan view illustrating a modification, and Fig. 5 is a side view corresponding with Fig. 4.

A leg-fender embodying my invention consists, essentially, of a strong band, $a$, of leather or other suitable material, having certain perforations $e$, and a strap or strip, R, or numbers of small strips R' threaded through the perforations, as shown. The band $a$ is of sufficient length and provided with a buckle or suitable fastening. The strap or strip R is of comparatively soft material—as rubber or a suitable composition of rubber or like gum. It may be of a circular, semicircular, or other suitable cross-section, the holes $e$ in the band $a$ being shaped accordingly for allowing the threading of the strip through them.

Instead of a continuous strap or strip, R, there may be a series of short strips, R', threaded through the band, as shown in Fig. 4, so that their ends project outward. A guard constructed according to my invention is easily taken apart, and does not allow dirt to lodge between it and the leg when in use, as all dirt thrown on the strap will fall through the openings $o\ o$.

What I claim as my invention is—

The leg-fender or interfering attachment for horses, consisting of the combination of a perforated band and a strip or strips of comparatively soft material threaded through the perforations of the said band, substantially as hereinabove described.

OTTO GLISMANN.

Witnesses:
    F. ENGEL,
    A. SCHAPER.